(12) United States Patent
Xie et al.

(10) Patent No.: US 10,162,209 B2
(45) Date of Patent: Dec. 25, 2018

(54) TOUCH SUBSTRATE, DISPLAY PANEL, DISPLAY APPARATUS, AND FABRICATING METHOD THEREOF

(71) Applicants: BOE TECHNOLOGY GROUP CO., LTD., Beijing (CN); HEFEI XINSHENG OPTOELECTRONICS TECHNOLOGY CO., LTD., Hefei, Anhui (CN)

(72) Inventors: Xiaodong Xie, Beijing (CN); Ming Hu, Beijing (CN); Ming Zhang, Beijing (CN); Jing Wang, Beijing (CN); Yu Zhu, Beijing (CN); Yuan Li, Beijing (CN)

(73) Assignees: BOE TECHNOLOGY GROUP CO., LTD., Beijing (CN); HEFEI XINSHENG OPTOELECTRONICS TECHNOLOGY CO., LTD., Hefei, Anhui (CN)

( * ) Notice: Subject to any disclaimer, the term of this patent is extended or adjusted under 35 U.S.C. 154(b) by 0 days.

(21) Appl. No.: 15/564,896

(22) PCT Filed: Nov. 30, 2016

(86) PCT No.: PCT/CN2016/108005
§ 371 (c)(1),
(2) Date: Oct. 6, 2017

(87) PCT Pub. No.: WO2018/098680
PCT Pub. Date: Jun. 7, 2018

(65) Prior Publication Data
US 2018/0307074 A1 Oct. 25, 2018

(51) Int. Cl.
*G06F 3/041* (2006.01)
*G02F 1/133* (2006.01)
(Continued)

(52) U.S. Cl.
CPC ........ *G02F 1/13338* (2013.01); *G02F 1/1343* (2013.01); *G02F 1/133512* (2013.01); *G06F 3/044* (2013.01); *G06F 3/0412* (2013.01)

(58) Field of Classification Search
CPC ........... G02F 1/13338; G02F 1/133512; G02F 1/1343; G06F 3/0412; G06F 3/044
See application file for complete search history.

(56) References Cited

U.S. PATENT DOCUMENTS

2015/0293559 A1  10/2015  Park et al.

FOREIGN PATENT DOCUMENTS

| CN | 104679316 A | 6/2015 |
| CN | 105487698 A | 4/2016 |

(Continued)

OTHER PUBLICATIONS

International Search Report & Written Opinion dated Jul. 27, 2017, regarding PCT/CN2016/108005.

*Primary Examiner* — Lisa Landis
(74) *Attorney, Agent, or Firm* — Intellectual Valley Law, P.C.

(57) ABSTRACT

The present application discloses a touch substrate including a base substrate; a black matrix layer on the base substrate in a black matrix area of the touch substrate; and a touch electrode layer on a side of the black matrix layer distal to the base substrate in a touch electrode area of the touch substrate. The touch electrode area partially overlaps with the black matrix area thereby forming an overlapping area. The touch electrode layer includes a plurality of touch electrode blocks at least partially in the overlapping area. A touch electrode block at least partially in the overlapping area is spaced apart from adjacent touch electrode blocks by a first gap. The black matrix layer in at least a portion of a region on a side of the first gap proximal to the base substrate (Continued)

has a reduced thickness relative to a thickness of a remaining portion of the black matrix layer.

20 Claims, 8 Drawing Sheets

(51) Int. Cl.
*G02F 1/1333* (2006.01)
*G06F 3/044* (2006.01)
*G02F 1/1343* (2006.01)
*G02F 1/1335* (2006.01)

(56) References Cited

FOREIGN PATENT DOCUMENTS

| | | | |
|---|---|---|---|
| CN | 106020530 A | | 10/2016 |
| CN | 106055147 | * | 10/2016 |
| CN | 106055147 A | | 10/2016 |
| JP | 2015204094 A | | 11/2015 |

* cited by examiner

FIG. 1A

*Related Art*

FIG. 1B

*Related Art*

TOUCH SUBSTRATE, DISPLAY PANEL, DISPLAY APPARATUS, AND FABRICATING METHOD THEREOF

CROSS-REFERENCE TO RELATED APPLICATION

This application is a national stage application under 35 U.S.C. § 371 of International Application No. PCT/CN2016/108005 filed Nov. 30, 2016, the contents of which are incorporated by reference in the entirety.

TECHNICAL FIELD

The present invention relates to a touch substrate, a display panel and a display apparatus having the same, and a fabricating method thereof.

BACKGROUND

In recent years, touch apparatuses have been widely used in many electronic devices such as mobile phones, computer display panels, touch screens, satellite navigation devices, digital cameras, etc. Examples of touch apparatuses include a mutual capacitive touch control device and a self-capacitive touch control device. In a mutual capacitive touch control device, the touch electrode can be a touch scanning electrode (Tx), whereas the touch sensing electrode (Rx) can be disposed on the color filter substrate. In a self-capacitive touch control device, the touch electrode can achieve touch control function alone.

When a finger of a user performs touch control functions on a touch panel, electrostatic charges accumulate on the touch panel. When the electrostatic charges are transmitted to the touch electrode, the touch control functions may be affected.

SUMMARY

In one aspect, the present invention provides a touch substrate comprising a base substrate; a black matrix layer on the base substrate in a black matrix area of the touch substrate; and a touch electrode layer on a side of the black matrix layer distal to the base substrate in a touch electrode area of the touch substrate; the touch electrode area partially overlapping with the black matrix area thereby forming an overlapping area; the touch electrode layer comprising a plurality of touch electrode blocks at least partially in the overlapping area; wherein a touch electrode block at least partially in the overlapping area is spaced apart from adjacent touch electrode blocks by a first gap; and the black matrix layer in at least a portion of a region on a side of the first gap proximal to the base substrate has a reduced thickness relative to a thickness of a remaining portion of the black matrix layer.

Optionally, the reduced thickness is zero, and the black matrix layer comprises a second gap in at least a portion of the region on a side of the first gap proximal to the base substrate.

Optionally, the black matrix layer comprises a groove in at least a portion of the region on a side of the first gap proximal to the base substrate.

Optionally, a projection on the base substrate of at least a portion of the black matrix layer having the reduced thickness substantially overlaps with that of the first gap.

Optionally, the black matrix layer comprising a plurality of black matrix blocks in the overlapping area; a black matrix block is spaced apart from adjacent black matrix blocks by a second gap; and a projection on the base substrate of the touch electrode block at least partially in the overlapping area substantially overlaps with that of the corresponding black matrix block.

Optionally, an area of the touch electrode block at least partially in the overlapping area is substantially equal to or less than an area of the corresponding black matrix block in plan view of the touch substrate.

Optionally, the plurality of touch electrode blocks at least partially in the overlapping area are spaced apart from each other by the first gap; and the plurality of black matrix blocks in the overlapping area are spaced apart from each other by the second gap; and a projection on the base substrate of each of the plurality of touch electrode blocks at least partially in the overlapping area substantially overlaps with that of corresponding one of the plurality of black matrix blocks in the overlapping area.

Optionally, a projection on the base substrate of the second gap substantially overlaps with that of the first gap.

Optionally, an area of each of the plurality of touch electrode blocks at least partially in the overlapping area is substantially equal to or less than an area of corresponding one of the plurality of black matrix blocks in the overlapping area in plan view of the touch substrate.

Optionally, the touch substrate further comprises an auxiliary black matrix layer on a side of the at least a portion of the black matrix layer having the reduced thickness distal to the base substrate.

Optionally, the first gap has a first gap distance, the second gap has a second gap distance; the first gap distance is substantially equal to or greater than the second gap distance.

Optionally, the first gap distance and the second gap distance are in a range of approximately 20 μm to approximately 40 μm.

Optionally, the touch electrode block at least partially in the overlapping area is one of a touch sensing electrode block, a touch scanning electrode block, and a dummy electrode block.

In another aspect, the present invention provides a method of fabricating a touch substrate comprising forming a black matrix layer on a base substrate, the black matrix layer defining a black matrix area of the touch substrate; and forming a touch electrode layer on a side of the black matrix layer distal to the base substrate; the touch electrode layer defining a touch electrode area of the touch substrate; the touch electrode area partially overlapping with the black matrix area thereby forming an overlapping area; the touch electrode layer being formed to comprise a plurality of touch electrode blocks at least partially in the overlapping area; wherein a touch electrode block at least partially in the overlapping area is formed to be spaced apart from adjacent touch electrode blocks by a first gap; and the black matrix layer in at least a portion of a region on a side of the first gap proximal to the base substrate is formed to have a reduced thickness relative to a thickness of a remaining portion of the black matrix layer.

Optionally, the reduced thickness is zero, and the black matrix layer is formed to comprise a second gap in at least a portion of the region on a side of the first gap proximal to the base substrate.

Optionally, the method comprises forming a black matrix material layer on the base substrate; forming the touch electrode layer on a side of the black matrix material layer distal to the base substrate; and removing a black matrix material in at least a portion of the region on a side of the first gap proximal to the base substrate thereby forming the black matrix layer.

Optionally, forming the black matrix layer comprises forming a black matrix material layer on the base substrate; and reducing a thickness of the black matrix material layer in a portion of the black matrix material layer thereby forming a portion having a reduced thickness; the method subsequently comprising forming the touch electrode layer on a side of the black matrix layer distal to the base substrate; wherein the first gap is formed on a side of the portion having the reduced thickness distal to the base substrate.

Optionally, the method comprises forming a black matrix material layer on the base substrate; and patterning the black matrix material layer to form a plurality of black matrix blocks in the overlapping area; wherein a black matrix block is formed to be spaced apart from adjacent black matrix blocks by a second gap; and a projection on the base substrate of the touch electrode block at least partially in the overlapping area substantially overlaps with that of the corresponding black matrix block.

Optionally, a projection on the base substrate of at least a portion having the reduced thickness substantially overlaps with that of the first gap.

Optionally, the plurality of touch electrode blocks at least partially in the overlapping area are formed to be spaced apart from each other by the first gap; and the plurality of black matrix blocks in the overlapping area are formed to be spaced apart from each other by the second gap; and a projection on the base substrate of each of the plurality of touch electrode blocks at least partially in the overlapping area substantially overlaps with that of corresponding one of the plurality of black matrix blocks in the overlapping area.

Optionally, a projection on the base substrate of the second gap substantially overlaps with that of the first gap.

Optionally, an area of the touch electrode block at least partially in the overlapping area is substantially equal to or less than an area of the corresponding black matrix block in plan view of the touch substrate.

Optionally, the first gap is formed to have a first gap distance, the second gap is formed to have a second gap distance; the first gap distance is substantially equal to or greater than the second gap distance.

Optionally, the method further comprises forming an auxiliary black matrix layer on a side of the at least a portion having the reduced thickness distal to the base substrate for blocking light from transmitting through the second gap.

Optionally, the step of forming the auxiliary black matrix layer is performed by screen printing.

In another aspect, the present invention provides a display panel comprising a touch substrate described herein or fabricated by a method described herein.

In another aspect, the present invention provides a display apparatus comprising a display panel described herein.

BRIEF DESCRIPTION OF THE FIGURES

The following drawings are merely examples for illustrative purposes according to various disclosed embodiments and are not intended to limit the scope of the present invention.

DETAILED DESCRIPTION

The disclosure will now describe more specifically with reference to the following embodiments. It is to be noted that the following descriptions of some embodiments are presented herein for purpose of illustration and description only. It is not intended to be exhaustive or to be limited to the precise form disclosed.

Figure 1A:
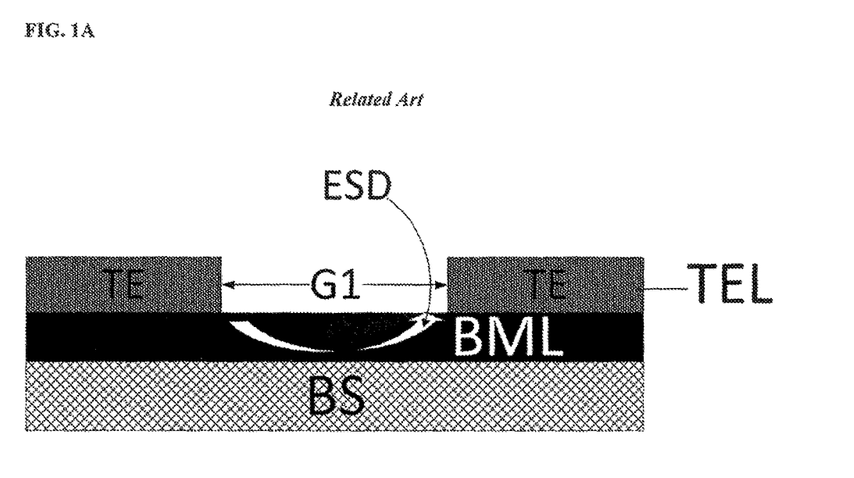
FIGS. 1A and 1B illustrate occurrence of electrostatic discharge in a black matrix layer in a conventional touch substrate.
Figure 1B:
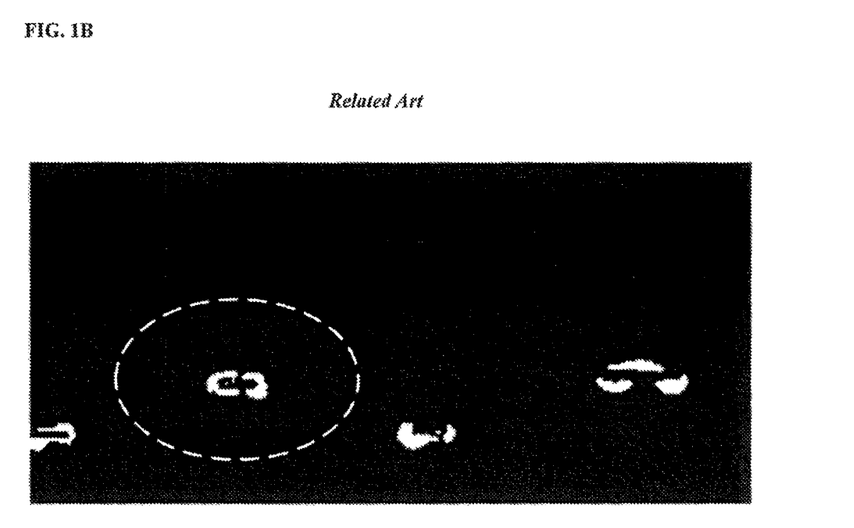

FIGS. 1A and 1B illustrate occurrence of electrostatic discharge in a black matrix layer in a conventional touch substrate. Referring to FIG. 1A, in a peripheral area of the conventional touch substrate, a touch electrode layer TEL is disposed on a black matrix layer BML. The touch electrode layer TEL includes a plurality of touch electrode blocks TE spaced apart by a gap G1, as shown in FIG. 1A. It is intended to insulate adjacent touch electrode blocks by spacing apart the touch electrode blocks, because the black matrix layer BML is made of insulating materials and is designed to have high resistance. For example, typically a black matrix layer BML is made of a material including carbon black material.

In a fabricating process of a conventional touch substrate, the touch substrate is subject to various processes, some of which is performed at a high temperature. The black matrix material deteriorates during the high temperature treatment process, resulting in a black matrix layer having lower resistance. As a result, at least some portions of the black matrix layer become prone to electrostatic discharge (ESD), as shown in FIG. 1A. FIG. B shows a touch substrate having electrostatic damages in a peripheral area (see, e.g., the dotted area). These electrostatic damages in the peripheral area of the touch substrate lead to touch control malfunction.

Accordingly, the present invention provides, inter alia, a touch substrate, a display panel and a display apparatus having the same, and a fabricating method thereof that substantially obviate one or more of the problems due to limitations and disadvantages of the related art. In one aspect, the present disclosure provides a touch substrate having a display area, a black matrix area, and a touch electrode area. The display area overlaps with the touch electrode area. The touch electrode area partially overlaps with the black matrix area. In some embodiments, the touch substrate includes a black matrix layer in the black matrix area of the touch substrate; and a touch electrode layer in the touch electrode area of the touch substrate; the touch electrode area partially overlapping with the black matrix area thereby forming an overlapping area. The touch electrode layer includes a plurality of touch electrode blocks at least partially in the overlapping area. A touch electrode block at least partially in the overlapping area is spaced apart from adjacent touch electrode blocks by a first gap. The black matrix layer in at least a portion of a region on a side of the first gap proximal to the base substrate has a reduced thickness relative to a thickness of a remaining portion of the black matrix layer. A projection of the portion having the reduced thickness substantially overlaps with that of the first gap in plan view of the touch substrate.

Optionally, the reduced thickness is great than zero, and the portion of the black matrix layer having the reduced thickness is a groove. Optionally, the black matrix layer includes a groove in at least a portion of the region on a side of the first gap proximal to the base substrate.

Optionally, the reduced thickness is zero, and the portion of the black matrix layer having the reduced thickness is a gap. Optionally, the black matrix layer includes a second gap in at least a portion of the region on a side of the first gap proximal to the base substrate.

In some embodiments, the black matrix layer includes a plurality of black matrix blocks in the overlapping area. A black matrix block is spaced apart from adjacent black matrix blocks by a second gap. Optionally, a projection of the touch electrode block at least partially in the overlapping area substantially overlaps with that of the corresponding black matrix block in plan view of the touch substrate.

Optionally, the black matrix layer includes a plurality of black matrix blocks in the overlapping area (e.g., entirely in the overlapping area), and further includes one or more black matrix block outside the overlapping area. Optionally, the black matrix block outside the overlapping area is an integral black matrix block surrounding the perimeter of the touch substrate. The one or more black matrix block outside the overlapping area is spaced apart and electrically insulated from adjacent black matrix blocks in the overlapping area.

Optionally, the touch electrode layer includes a plurality of touch electrode blocks at least partially in the overlapping area, and further includes a plurality of touch electrode blocks entirely outside the overlapping area (e.g., in the display area). Optionally, the touch substrate is a self-capacitive touch substrate. Optionally, the touch substrate is a mutual-capacitive touch substrate.

As used herein, the term "display area" refers to an area of the touch substrate where image is actually displayed. Optionally, the display area may include both a subpixel region and an inter-subpixel region. A subpixel region refers to a light emission region of a subpixel, such as a region corresponding to a pixel electrode in a liquid crystal display or a region corresponding to a light emissive layer in an organic light emitting display. An inter-subpixel region refers to a region between adjacent subpixel regions, such as a region corresponding to a black matrix in a liquid crystal display or a region corresponding a pixel definition layer in an organic light emitting display. Optionally, the inter-subpixel region is a region between adjacent subpixel regions in a same pixel. Optionally, the inter-subpixel region is a region between two adjacent subpixel regions from two adjacent pixels.

As used herein the term "peripheral area" refers to an area where various circuits and wires are provided to transmit signals to the touch substrate. To increase the transparency of the display apparatus, non-transparent or opaque components of the display apparatus (e.g., battery, printed circuit board, metal frame), can be disposed in the peripheral area rather than in the display areas.

As used herein the term "touch electrode area" refers an area of a touch substrate that includes a touch electrode layer, e.g., the touch electrode area is defined by the touch electrode layer. Optionally, a touch electrode layer includes touch electrodes (e.g., touch sensing electrodes and touch scanning electrodes) and dummy electrodes. Optionally, the touch electrode area includes a plurality of touch electrodes and a plurality of dummy electrodes.

As used herein the term "black matrix area" refers to an area of a touch substrate that includes a peripheral black matrix layer, e.g., the black matrix area is defined by the peripheral black matrix layer. Optionally, the black matrix area is outside the display area. Optionally, the black matrix area partially overlaps with the touch electrode area.

Figure 2:
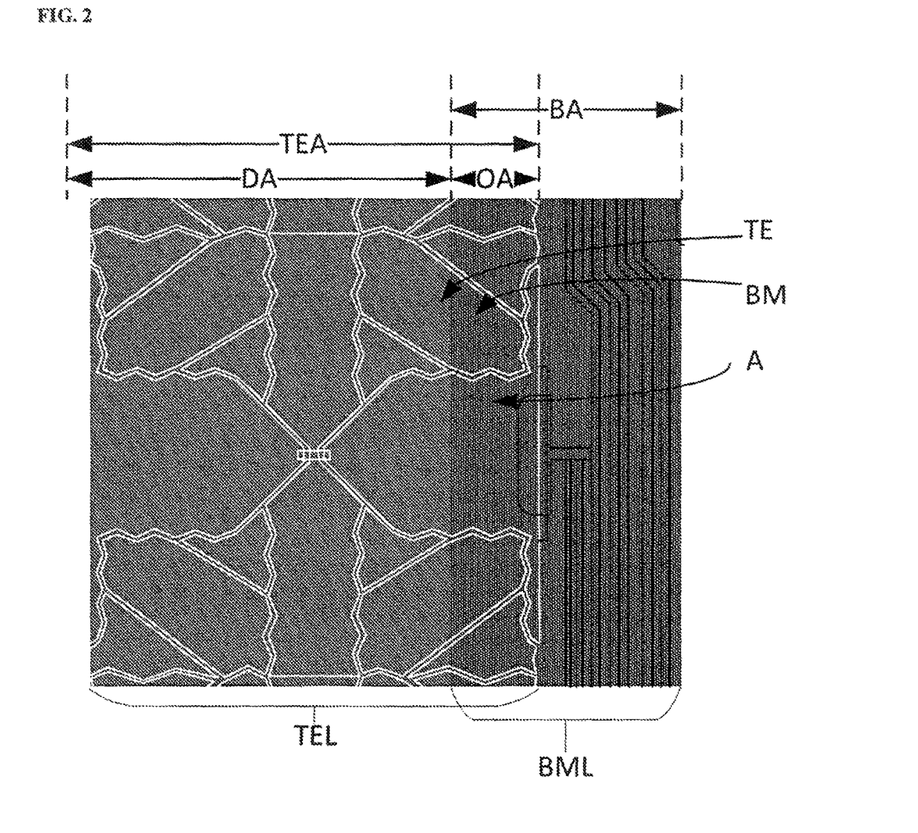
FIG. 2 is a diagram illustrating the structure of a portion of a touch substrate in some embodiments according to the present disclosure.

FIG. 2 is a diagram illustrating the structure of a portion of a touch substrate in some embodiments according to the present disclosure. Referring to FIG. 2, the touch substrate in the embodiment includes a display area DA and a black matrix area BA. In FIG. 2, the black matrix area BA is substantially co-extensive as the area having a black matrix layer BML. The touch electrode area TEA in FIG. 2 is defined by the touch electrode layer TEL. As shown in FIG. 2, the touch electrode layer TEL includes a plurality of rows of touch sensing electrodes Rx, a plurality of columns of touch scanning electrodes Tx, and a plurality of dummy electrodes D. As used herein, a touch electrode broadly refers to any of a touch sensing electrode, a touch scanning electrode, and a dummy electrode in a mutual-capacitive touch substrate. Further, a touch electrode may be a touch electrode in a self-capacitive touch substrate.

The touch electrode area TEA partially overlaps with the black matrix area BA, i.e., the touch electrode area TEA includes a first portion and a second portion. The first portion in FIG. 2 is co-extensive with the display area DA. The second portion is an overlapping area OA where the touch electrode area TEA and the black matrix area BA overlap with each other.

In the overlapping area OA, the black matrix layer BML includes a plurality of black matrix blocks BM. On the other hand, the touch electrode layer TEL includes a plurality of touch electrode blocks TE at least partially in the overlapping area OA. Optionally, the touch electrode layer TEL may include one or more touch electrode block (e.g., a dummy electrode) entirely in the overlapping area OA. Each of the plurality of black matrix blocks BM in the overlapping area OA is spaced apart from adjacent black matrix blocks BM by a second gap O2 (see, e.g., FIG. 4 and FIG. 5A). Optionally, each of the plurality of black matrix blocks BM in the overlapping area OA has a boundary substantially complementary to those of adjacent black matrix blocks BM. Each of the plurality of touch electrode blocks TE at least partially in the overlapping area OA is spaced apart and electrically insulated from adjacent touch electrode blocks TE by a first gap G1 (see, e.g., FIG. 4 and FIG. 5A). Optionally, each of the plurality of touch electrode blocks TE at least partially in the overlapping area OA has a boundary substantially complementary to those of adjacent touch electrode blocks TE. Optionally, a projection of each of the plurality of touch electrode blocks TE at least partially in the overlapping area OA substantially overlaps with that of corresponding one of the plurality of black matrix blocks BM in the overlapping area OA in plan view of the touch substrate.

Figure 3:
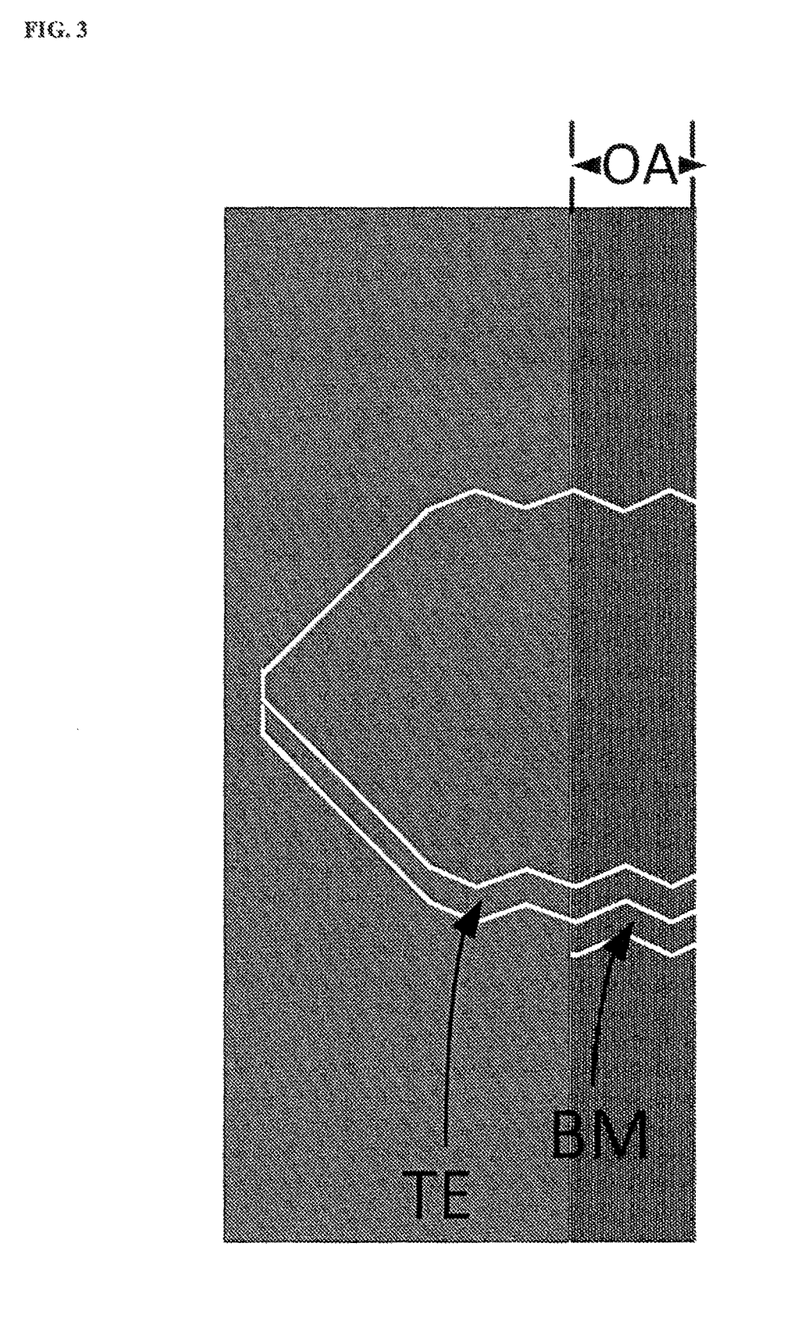
FIG. 3 is a diagram illustrating the structure of a pair of overlapping black matrix block and touch electrode block in some embodiments according to the present disclosure.

FIG. 3 is a diagram illustrating the structure of a pair of overlapping black matrix block and touch electrode block in some embodiments according to the present disclosure. Referring to FIG. 2 and FIG. 3, the touch electrode block TE at least partially in the overlapping area OA is a touch sensing electrode Rx. The touch electrode block TE at least partially in the overlapping area OA is spaced apart from adjacent touch electrode blocks TE by a first gap G1 (see, e.g., FIG. 4 and FIG. 5A). In the overlapping area OA, the touch substrate includes a black matrix block BM corresponding to the touch electrode block TE at least partially in the overlapping area OA on a side of the touch electrode block TE proximal to a base substrate (not explicitly shown). A projection of the touch electrode block TE at least partially in the overlapping area OA substantially overlaps with that of the corresponding black matrix block BM in the overlapping area OA in plan view of the touch substrate.

Figure 4:
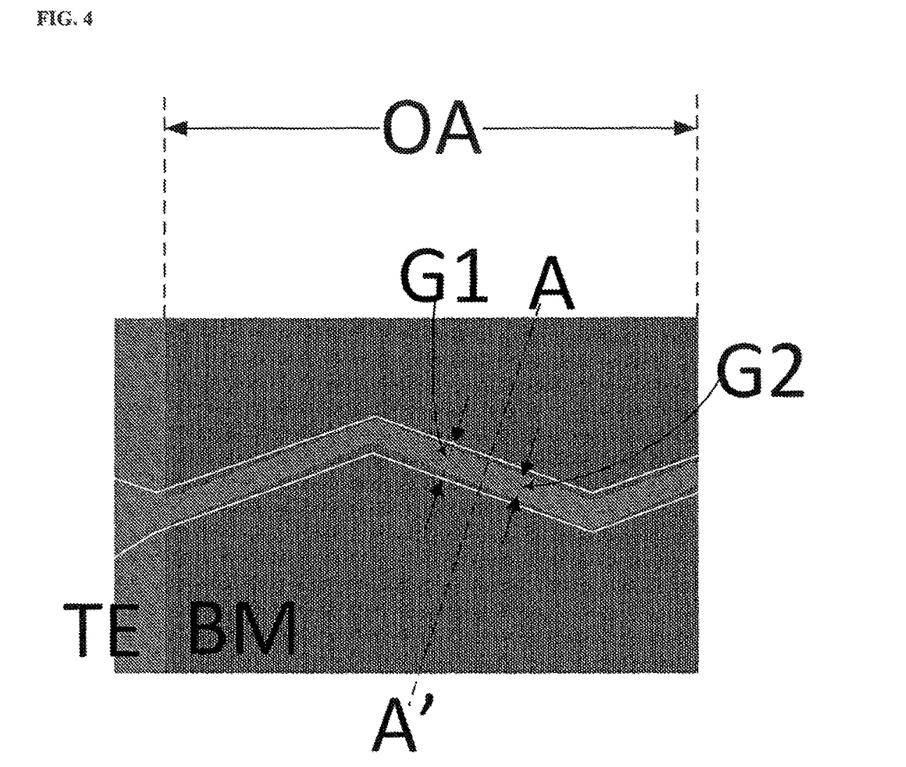
FIG. 4 is a zoom-in view of an area A circled by dotted line in FIG. 2.
Figure 5A:
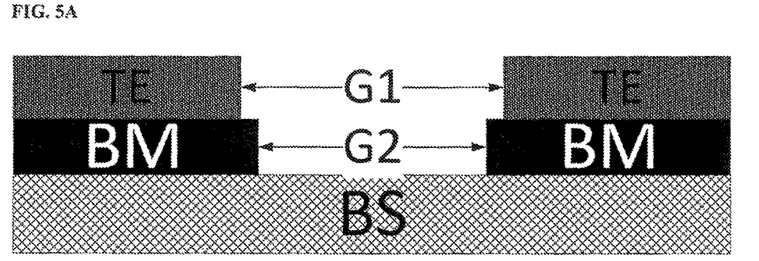
FIG. 5A is a cross-sectional view along the A-A' direction of the touch substrate in FIG. 4.

FIG. 4 is a zoom-in view of an area A circled by dotted line in FIG. 2. FIG. 5A is a cross-sectional view along the A-A' direction of the touch substrate in FIG. 4. Referring to FIG. 4 and FIG. 5A, the touch electrode block TE at least partially in the overlapping area OA is spaced apart from adjacent touch electrode blocks TE by a first gap G1, the corresponding black matrix block BM is spaced apart and electrically insulated from adjacent black matrix blocks BM by a second gap G2. A projection of second gap G2 substantially overlaps with that of the first gap G1 in plan view of the touch substrate. Optionally, each of the plurality of touch electrode blocks TE at least partially in the overlapping area OA are spaced apart from each other by the first gap G1; and the plurality of black matrix blocks BM in the overlapping area OA are spaced apart from each other by the second gap G2; and a projection of the second gap G2 substantially overlaps with the first gap G1 in plan view of the touch substrate.

Referring to FIG. 4 and FIG. 5A, the first gap G1 is wider than the second gap G2. The first gap G1 has a first gap distance and the second gap 0G2 has a second gap distance. In FIG. 4 and FIG. 5A, the first gap distance is greater than the second gap distance. Optionally, the first gap distance is substantially the same as the second gap distance. Optionally, the first gap distance and the second gap distance are in a range of approximately 20 μm to approximately 40 μm, e.g., approximately 20 μm to approximately 30 μm, approximately 25 μm to approximately 35 μm, and approximately 30 μm to approximately 40 μm. Depending on the design of touch electrode patterns, the first gap distance may be varied, and the second gap distance may be varied corresponding to the first gap distance. Optionally, a second gap distance in a range of approximately 20 μm to approximately 40 μm is sufficient.

Optionally, an area of each of the plurality of touch electrode blocks at least partially in the overlapping area is substantially equal to or less than an area of corresponding one of the plurality of black matrix blocks in the overlapping area OA in plan view of the touch substrate.

Figure 5B:
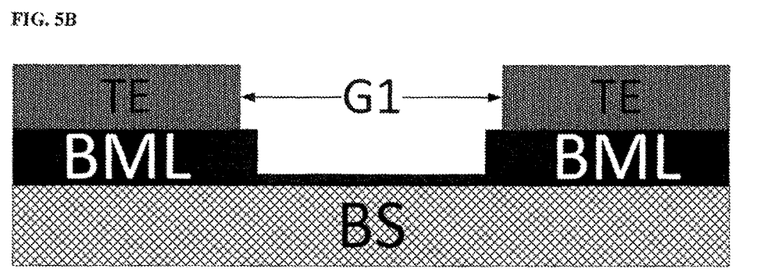
FIG. 5B is a cross-sectional view of a touch substrate in some embodiments according to the present disclosure.

FIG. 5B is a cross-sectional view of a touch substrate in some embodiments according to the present disclosure. Referring to FIG. 5B, the portion of the black matrix layer BML on a side of the first gap G1 proximal to the base substrate BS has a reduced thickness relative to a thickness of a remaining portion of the black matrix layer BML. The reduced thickness is greater than zero, thereby forming a groove in the black matrix layer BML. By having the thickness reduced in the portion of the black matrix layer BML underneath the first gap G1, the black matrix material in the portion is spaced apart from the touch electrode blocks TE, preventing the occurrence of electrostatic discharge. Similarly, it was discovered in the present disclosure that it is not required to have a gap or a groove in all portions of the black matrix layer BML corresponding to the first gap G1 in the touch electrode layer. Electrostatic discharge can be effectively prevented or significantly reduced as long as a groove or a gap is formed in some portions of the black matrix layer BML corresponding to the first gap G1 in the touch electrode layer.

Figure 6:
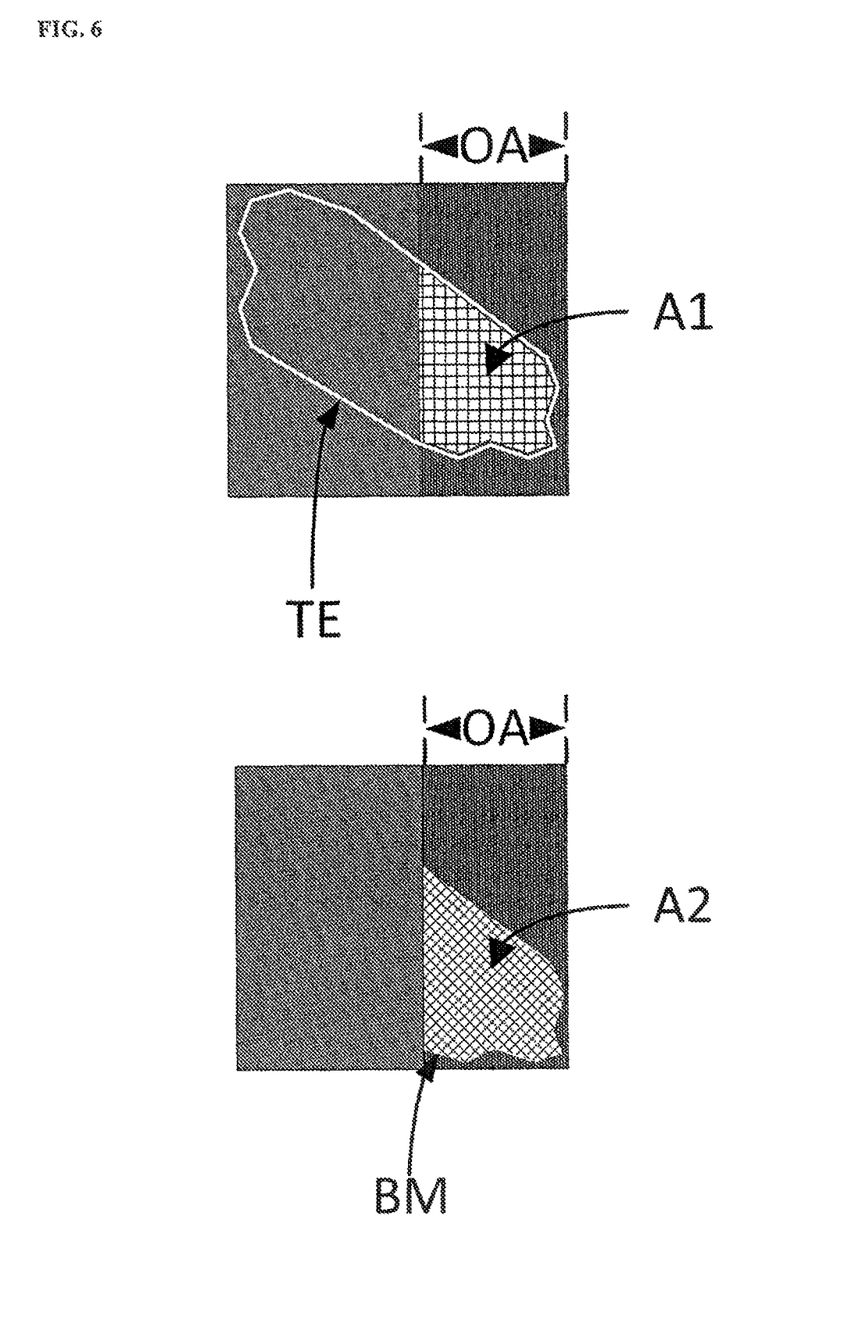
FIG. 6 is a diagram illustrating the structure of a pair of overlapping black matrix block and touch electrode block in some embodiments according to the present disclosure.

FIG. 6 is a diagram illustrating the structure of a pair of overlapping black matrix block and touch electrode block in some embodiments according to the present disclosure. The touch electrode block TE in FIG. 6 is a dummy electrode. Referring to FIG. 6, the touch electrode block TE at least partially in the overlapping area OA has an area A1 in the overlapping area OA less than an area A2 in the overlapping area OA of the corresponding black matrix block BM in plan view of the touch substrate. Optionally, the touch electrode block TE at least partially in the overlapping area OA has an area A1 in the overlapping area OA substantially equal to an area A2 in the overlapping area OA of the corresponding black matrix block BM in plan view of the touch substrate.

Figure 7:
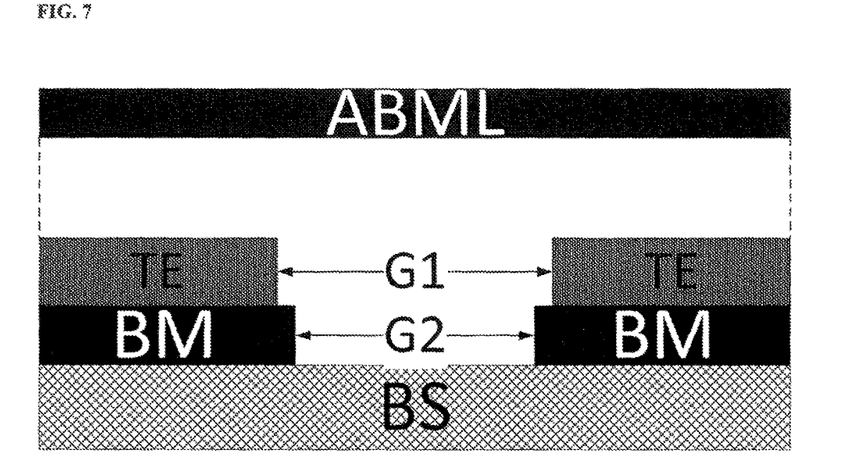
FIG. 7 is a diagram illustrating the structure of a portion of a touch substrate in some embodiments according to the present disclosure.

As shown in FIG. 5A, the electrostatic discharge issue due to the deteriorated black matrix layer underneath the first gap G1 between touch electrode blocks TE is obviated in the present touch substrate, because the second gap G2 spaces apart adjacent black matrix blocks BM. Because the black matrix layer is absent in the second gap G2, light transmits through the second gap G2, affecting image display. Accordingly, in some embodiments of the present disclosure, the touch substrate further includes an auxiliary black matrix layer on a side of the second gap G2 distal to the base substrate BS for blocking light from transmitting through the second gap G2. FIG. 7 is a diagram illustrating the structure of a portion of a touch substrate in some embodiments according to the present disclosure. Referring to FIG. 7, the auxiliary black matrix layer ABML is disposed on side of the second gap G2 distal to the base substrate BS. Light that may transmit through the second gap G2 is blocked by the auxiliary black matrix layer ABML.

The touch substrate may be a self-capacitive touch substrate. Optionally, the touch substrate may be a mutual-capacitive touch substrate. Optionally, the touch electrode layer includes a plurality rows of first electrode (e.g., touch sensing electrode Rx) and a plurality of columns of second electrode (e.g., touch scanning electrodes Tx). Optionally, the touch electrode layer further includes a plurality of dummy electrodes. The touch substrate may further include a conductive bridge layer having a plurality of conductive bridges; and an insulating layer having a plurality of insulating blocks on a side of the conductive bridge layer proximal to the touch electrode layer. Optionally, each row of first electrode includes a plurality of first electrode blocks spaced apart from each other along a row direction. Two adjacent first electrode blocks along the row direction are electrically connected by a conductive bridge.

Figure 8:
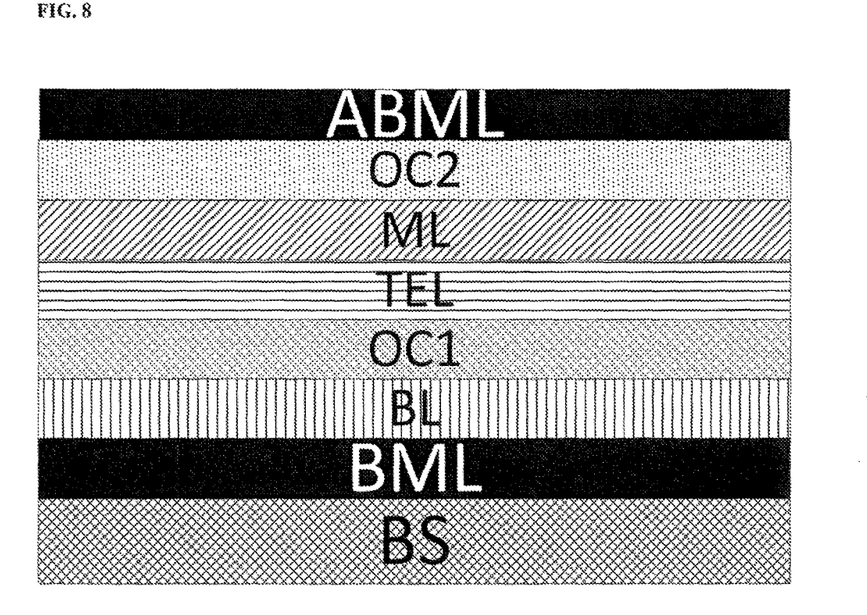
FIG. 8 is a diagram illustrating the structure of a portion of a touch substrate in some embodiments according to the present disclosure.

FIG. 8 is a diagram illustrating the structure of a portion of a touch substrate in some embodiments according to the present disclosure. Referring to FIG. 8, the touch substrate in the embodiment includes a black matrix layer BML on a base substrate BS, a conductive bridge layer BL on a side of the black matrix layer BML distal to the base substrate BS, a first overcoat layer OC1 on a side of the conductive bridge layer BL distal to the black matrix layer BML, a touch electrode layer TEL on a side of the first overcoat layer OC1 distal to the conductive bridge layer BL, a metal signal line layer ML on a side of the touch electrode layer TEL distal to the first overcoat layer OC1, and a second overcoat layer OC2 on a side of the metal signal line layer ML distal to the touch electrode layer TEL. Optionally, the touch substrate further includes an auxiliary black matrix layer ABML on a side of the second overcoat layer OC2 distal to the metal signal line layer ML.

In another aspect, the present invention provides a method of fabricating a touch substrate having a display area, a black matrix area, and a touch electrode area. The display area overlaps with the touch electrode area. The touch electrode area partially overlaps with the black matrix area. In some embodiments, the touch substrate includes a black matrix layer in the black matrix area of the touch substrate; and a touch electrode layer in the touch electrode area of the touch substrate; the touch electrode area partially overlapping with the black matrix area thereby forming an overlapping area. In some embodiments, the method includes forming a black matrix layer on a base substrate, the black matrix layer defining a black matrix area of the touch substrate; and forming a touch electrode layer on a side of the black matrix layer distal to the base substrate; the touch electrode layer defining a touch electrode area of the touch substrate; the touch electrode area partially overlapping with the black matrix area thereby forming an overlapping area. The touch electrode layer is formed to include a plurality of touch electrode blocks at least partially in the overlapping area. An touch electrode block at least partially in the overlapping area is formed to be spaced apart from adjacent touch electrode blocks by a first gap. The black matrix layer in at least a portion of a region on a side of the first gap proximal to the base substrate is formed to have a reduced thickness relative to a thickness of a remaining portion of the black matrix layer. Optionally, a projection of at least a portion of the black matrix layer having the reduced thickness substantially overlaps with that of the first gap in plan view of the touch substrate.

Optionally, the reduced thickness is great than zero, and the portion of the black matrix layer having the reduced thickness is a groove. Optionally, the black matrix layer includes a groove in at least a portion of the region on a side of the first gap proximal to the base substrate.

Optionally, the reduced thickness is zero, and the portion of the black matrix layer having the reduced thickness is a gap. Optionally, the black matrix layer includes a second gap in at least a portion of the region on a side of the first gap proximal to the base substrate.

Various appropriate methods may be used to form the portion having the reduced thickness in the black matrix layer. In some embodiments, the touch electrode layer having the first gap may be used as a mask plate for forming the portion having the reduced thickness in the black matrix layer. In some embodiments, the method includes forming a black matrix material layer on the base substrate; forming the touch electrode layer on a side of the black matrix material layer distal to the base substrate; and removing a black matrix material in at least a portion of the region on a side of the first gap proximal to the base substrate thereby forming the black matrix layer. In one example, the touch electrode layer is formed by lithography of a photoresist layer, and an etching step to remove touch electrode material in regions corresponding to the first gap. Once the first gap is formed in the touch electrode layer, the black matrix material underneath the first gap can be etched by an etchant.

The portion having the reduced thickness in the black matrix layer may be formed prior to forming the touch electrode layer. In some embodiments, the method includes forming a black matrix material layer on the base substrate; and patterning the black matrix material layer to form a black matrix layer having a portion that has a reduced thickness relative to a thickness of a remaining portion of the black matrix layer. In some embodiments, the step of forming the black matrix layer includes forming a black matrix material layer on the base substrate, and reducing a thickness of the black matrix material layer in a portion of the black matrix material layer thereby forming a portion having a reduced thickness. The region having the reduced thickness corresponds to at least a portion of the first gap. Subsequently, the method further includes forming the touch electrode layer on a side of the black matrix layer distal to the base substrate. The touch electrode layer is formed to have a plurality of touch electrode blocks at least partially in the overlapping area, a touch electrode block at least partially in the overlapping area is formed to be spaced apart from adjacent touch electrode blocks by a first gap. The first gap is formed on a side of the portion having the reduced thickness distal to the base substrate.

In some embodiments, the step of forming the black matrix layer includes forming a plurality of black matrix blocks in the overlapping area. A black matrix block is formed to be spaced apart from adjacent black matrix blocks by a second gap. A projection of the touch electrode block at least partially in the overlapping area substantially overlaps with that of the corresponding black matrix block in plan view of the touch substrate.

In some embodiments, the step of forming the black matrix layer includes forming a plurality of black matrix blocks in the overlapping area. Optionally, the method includes forming a black matrix material layer on the base substrate; and patterning the black matrix material layer to form a plurality of black matrix blocks in the overlapping area. A black matrix block is formed to be spaced apart from adjacent black matrix blocks by a second gap. A projection of the touch electrode block at least partially in the overlapping area substantially overlaps with that of the corresponding black matrix block in plan view of the touch substrate. Optionally, an area of the touch electrode block at least partially in the overlapping area is substantially equal to or less than an area of the black matrix block in plan view of the touch substrate. Optionally, the touch electrode block at least partially in the overlapping area has a boundary substantially complementary to those of adjacent touch electrode blocks. Optionally, the black matrix block has a boundary substantially complementary to those of adjacent black matrix blocks. Optionally, a projection of the second gap substantially overlaps with that of the first gap in plan view of the touch substrate.

In some embodiments, the plurality of touch electrode blocks at least partially in the overlapping area are formed to be spaced apart from each other by the first gap; and the plurality of black matrix blocks in the overlapping area are formed to be spaced apart from each other by the second gap; and a projection of each of the plurality of touch electrode blocks at least partially in the overlapping area substantially overlaps with that of corresponding one of the plurality of black matrix blocks in the overlapping area in plan view of the touch substrate. Optionally, a projection of the second gap substantially overlaps with that of the first gap in plan view of the touch substrate. Optionally, each of the plurality of black matrix blocks in the overlapping area has a boundary substantially complementary to those of adjacent black matrix blocks. Each of the plurality of touch electrode blocks at least partially in the overlapping area is spaced apart and electrically insulated from adjacent touch electrode blocks by a second gap. Optionally, each of the plurality of touch electrode blocks at least partially in the overlapping area has a boundary substantially complementary to those of adjacent touch electrode blocks. Optionally, an area of each of the plurality of touch electrode blocks at least partially in the overlapping area is substantially equal to or less than an area of corresponding one of the plurality of black matrix blocks in the overlapping area in plan view of the touch substrate.

In some embodiments, the first gap is formed to have a first gap distance, the second gap is formed to have a second gap distance; the first gap distance is substantially equal to or greater than the second gap distance. Optionally, the first gap distance is substantially the same as the second gap distance. Optionally, the first gap distance and the second gap distance are in a range of approximately 20 µm to approximately 40 µm, e.g., approximately 20 µm to approximately 30 µm, approximately 25 µm to approximately 35 µm, and approximately 30 µm to approximately 40 µm.

Figure 9:
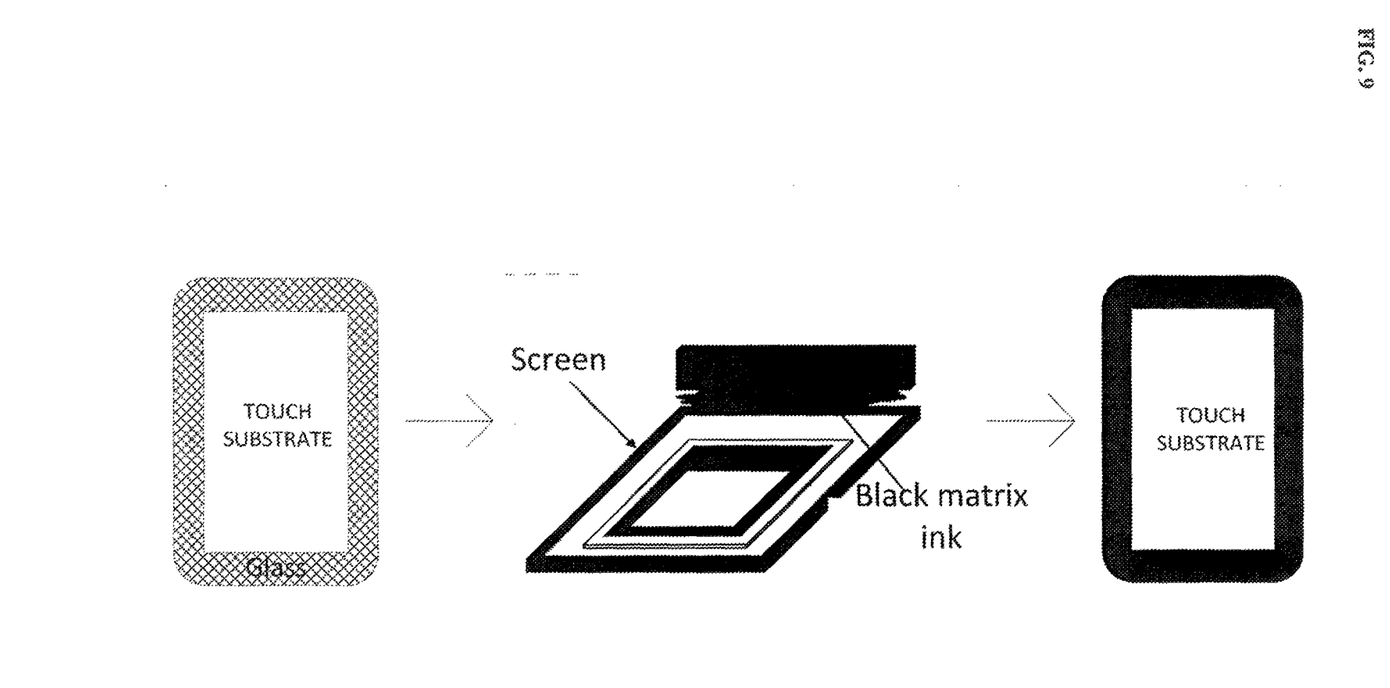
FIG. 9 illustrates a process of forming an auxiliary black matrix layer in a touch substrate in some embodiments according to the present disclosure.

In some embodiments, the method further includes forming an auxiliary black matrix layer in the peripheral area on a side of the second gap distal to the base substrate for blocking light from transmitting through the second gap. FIG. 9 illustrates a process of forming an auxiliary black matrix layer in a touch substrate in some embodiments according to the present disclosure. Referring to FIG. 9, the step of forming the auxiliary black matrix layer is performed by screen printing in which a black matrix ink is printed on the touch substrate using a screen. Optionally, the black matrix ink includes a carbon black material. Various alternative methods may be used for making the auxiliary black matrix layer, e.g., by lithography.

In some embodiments, the touch substrate is a self-capacitive touch substrate. In some embodiments, the touch substrate is a mutual-capacitive touch substrate. Optionally, the method includes forming a plurality rows of first electrode (e.g., touch sensing electrode Rx) and forming a plurality of columns of second electrode (e.g., touch scanning electrodes Tx). Optionally, the method further includes forming a plurality of dummy electrodes.

In some embodiments, the method further includes forming a conductive bridge layer having a plurality of conductive bridges; and forming an insulating layer having a plurality of insulating blocks on a side of the conductive bridge layer proximal to the touch electrode layer. The plurality of rows of first electrodes and the plurality of columns of second electrodes cross over each other forming a plurality of intersections corresponding to the plurality of insulating blocks; each intersection corresponding to an insulating block. Optionally, each row of first electrode is formed to include a plurality of first electrode blocks spaced apart from each other along a row direction. Two adjacent first electrode blocks along the row direction are electrically connected by a conductive bridge.

In some embodiments, the method includes forming a black matrix layer on a base substrate, forming a conductive bridge layer on a side of the black matrix layer distal to the base substrate, forming a first overcoat layer on a side of the conductive bridge layer distal to the black matrix layer, forming a touch electrode layer on a side of the first overcoat layer distal to the conductive bridge layer, forming a metal signal line layer on a side of the touch electrode layer distal to the first overcoat layer, and forming a second overcoat layer on a side of the metal signal line layer distal to the touch electrode layer. Optionally, the method further includes forming an auxiliary black matrix layer on a side of the second overcoat layer distal to the metal signal line layer.

In another aspect, the present invention provides a display panel having a touch substrate described herein or fabricated by a method described herein.

In another aspect, the present invention provides a display apparatus having a display panel described herein. Examples of appropriate display apparatuses include, but are not limited to, an electronic paper, a mobile phone, a tablet computer, a television, a monitor, a notebook computer, a digital album, a GPS, etc.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A touch substrate, comprising:
    a base substrate; a black matrix layer on the base substrate in a black matrix area of the touch substrate; and a touch electrode layer on a side of the black matrix layer distal to the base substrate in a touch electrode area of the touch substrate; the touch electrode area partially overlapping with the black matrix area thereby forming an overlapping area; the touch electrode layer comprising a plurality of touch electrode blocks at least partially in the overlapping area;
    wherein a touch electrode block at least partially in the overlapping area is spaced apart from adjacent touch electrode blocks by a first gap; and
    the black matrix layer in at least a portion of a region on a side of the first gap proximal to the base substrate has a reduced thickness relative to a thickness of a remaining portion of the black matrix layer.

2. The touch substrate of claim 1, wherein the reduced thickness is zero, and the black matrix layer comprises a second gap in at least a portion of the region on a side of the first gap proximal to the base substrate.

3. The touch substrate of claim 1, wherein the black matrix layer comprises a groove in at least a portion of the region on a side of the first gap proximal to the base substrate.

4. The touch substrate of claim 1, wherein a projection on the base substrate of at least a portion of the black matrix layer having the reduced thickness substantially overlaps with that of the first gap.

5. The touch substrate of claim 1, wherein the black matrix layer comprising a plurality of black matrix blocks in the overlapping area;
   a black matrix block is spaced apart from adjacent black matrix blocks by a second gap; and
   a projection on the base substrate of the touch electrode block at least partially in the overlapping area substantially overlaps with that of the corresponding black matrix block.

6. The touch substrate of claim 5, wherein an area of the touch electrode block at least partially in the overlapping area is substantially equal to or less than an area of the corresponding black matrix block in plan view of the touch substrate.

7. The touch substrate of claim 5, wherein the plurality of touch electrode blocks at least partially in the overlapping area are spaced apart from each other by the first gap; and the plurality of black matrix blocks in the overlapping area are spaced apart from each other by the second gap; and
   a projection on the base substrate of each of the plurality of touch electrode blocks at least partially in the overlapping area substantially overlaps with that of corresponding one of the plurality of black matrix blocks in the overlapping area.

8. The touch substrate of claim 7, wherein a projection on the base substrate of the second gap substantially overlaps with that of the first gap.

9. The touch substrate of claim 7, wherein an area of each of the plurality of touch electrode blocks at least partially in the overlapping area is substantially equal to or less than an area of corresponding one of the plurality of black matrix blocks in the overlapping area in plan view of the touch substrate.

10. The touch substrate of claim 1, further comprising an auxiliary black matrix layer on a side of the at least a portion of the black matrix layer having the reduced thickness distal to the base substrate.

11. The touch substrate of claim 2, wherein the first gap has a first gap distance, the second gap has a second gap distance; the first gap distance is substantially equal to or greater than the second gap distance.

12. The touch substrate of claim 11, wherein the first gap distance and the second gap distance are in a range of approximately 20 μm to approximately 40 μm.

13. The touch substrate of claim 1, wherein the touch electrode block at least partially in the overlapping area is one of a touch sensing electrode block, a touch scanning electrode block, and a dummy electrode block.

14. A display panel, comprising a touch substrate of claim 1.

15. A method of fabricating a touch substrate, comprising:
   forming a black matrix layer on a base substrate, the black matrix layer defining a black matrix area of the touch substrate; and
   forming a touch electrode layer on a side of the black matrix layer distal to the base substrate; the touch electrode layer defining a touch electrode area of the touch substrate; the touch electrode area partially overlapping with the black matrix area thereby forming an overlapping area; the touch electrode layer being formed to comprise a plurality of touch electrode blocks at least partially in the overlapping area;
   wherein a touch electrode block at least partially in the overlapping area is formed to be spaced apart from adjacent touch electrode blocks by a first gap; and
   the black matrix layer in at least a portion of a region on a side of the first gap proximal to the base substrate is formed to have a reduced thickness relative to a thickness of a remaining portion of the black matrix layer.

16. The method of claim 15, wherein the reduced thickness is zero, and the black matrix layer is formed to comprise a second gap in at least a portion of the region on a side of the first gap proximal to the base substrate.

17. The method of claim 15, comprising:
   forming a black matrix material layer on the base substrate;
   forming the touch electrode layer on a side of the black matrix material layer distal to the base substrate; and
   removing the black matrix material in at least a portion of the region on a side of the first gap proximal to the base substrate thereby forming the black matrix layer.

18. The method of claim 15, wherein forming the black matrix layer comprises forming a black matrix material layer on the base substrate; and
   reducing a thickness of the black matrix material layer in a portion of the black matrix material layer thereby forming a portion having a reduced thickness;
   the method subsequently comprising:
   forming the touch electrode layer on a side of the black matrix layer distal to the base substrate;
   wherein the first gap is formed on a side of the portion having the reduced thickness distal to the base substrate.

19. The method of claim 15, comprising:
   forming a black matrix material layer on the base substrate; and
   patterning the black matrix material layer to form a plurality of black matrix blocks in the overlapping area;
   wherein a black matrix block is formed to be spaced apart from adjacent black matrix blocks by a second gap; and
   a projection on the base substrate of the touch electrode block at least partially in the overlapping area substantially overlaps with that of the corresponding black matrix block.

20. The method of claim 15, further comprising forming an auxiliary black matrix layer on a side of the at least a portion having the reduced thickness distal to the base substrate for blocking light from transmitting through the second gap, wherein the step of forming the auxiliary black matrix layer is performed by screen printing.

* * * * *